United States Patent
Voge et al.

(10) Patent No.: US 8,614,276 B2
(45) Date of Patent: *Dec. 24, 2013

(54) SELF-SEALING COMPOSITION FOR PNEUMATIC OBJECT

(75) Inventors: Bozena Voge, Cournon D'Auvergne (FR); Didier Vasseur, Clermont-Ferrand (FR); Jose Merino Lopez, Riom (FR); Frederic Pialot, Moissat (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/057,134

(22) PCT Filed: Jul. 23, 2009

(86) PCT No.: PCT/EP2009/005345
§ 371 (c)(1),
(2), (4) Date: May 2, 2011

(87) PCT Pub. No.: WO2010/012413
PCT Pub. Date: Feb. 4, 2010

(65) Prior Publication Data
US 2011/0198010 A1 Aug. 18, 2011

(30) Foreign Application Priority Data

Aug. 1, 2008 (FR) ..................................... 08 55319

(51) Int. Cl.
*C08K 5/01* (2006.01)
*B29C 73/00* (2006.01)
*B60C 1/00* (2006.01)

(52) U.S. Cl.
USPC ........... 524/571; 524/445; 524/484; 523/166; 152/502

(58) Field of Classification Search
USPC ......... 524/262, 430, 445, 451, 105, 484, 571, 524/575.5, 493; 525/342; 523/166; 152/502
See application file for complete search history.

(56) References Cited

U.S. PATENT DOCUMENTS

| | | | | |
|---|---|---|---|---|
| 4,064,922 A | | 12/1977 | Farber et al. | |
| 4,919,183 A | | 4/1990 | Dobson | |
| 5,085,942 A | * | 2/1992 | Hong et al. | 428/492 |
| 5,627,237 A | * | 5/1997 | Halasa et al. | 525/237 |
| 5,785,779 A | * | 7/1998 | McGee et al. | 152/204 |
| 6,103,808 A | * | 8/2000 | Hashimoto | 524/484 |
| 2002/0115767 A1 | * | 8/2002 | Cruse et al. | 524/262 |
| 2003/0230376 A1 | | 12/2003 | Smith, Sr. et al. | |
| 2004/0092644 A1 | * | 5/2004 | Labauze | 524/492 |
| 2005/0205185 A1 | * | 9/2005 | Reiter et al. | 152/504 |
| 2006/0083881 A1 | | 4/2006 | Saito et al. | |
| 2006/0092644 A1 | * | 5/2006 | Mok et al. | 362/327 |
| 2006/0194898 A1 | * | 8/2006 | Sanda, Jr. | 523/166 |
| 2007/0054994 A1 | * | 3/2007 | Kanz et al. | 524/105 |
| 2007/0167557 A1 | * | 7/2007 | Dumke et al. | 524/495 |
| 2008/0009564 A1 | * | 1/2008 | Robert et al. | 523/351 |
| 2010/0051158 A1 | * | 3/2010 | Albert et al. | 152/504 |

FOREIGN PATENT DOCUMENTS

| | | |
|---|---|---|
| EP | 0 304 904 | 3/1989 |
| FR | 2 866 028 | 8/2005 |
| FR | 2 877 348 | 5/2006 |
| JP | 51-113904 | 10/1976 |
| JP | 52-137803 | 11/1977 |
| JP | 63-069878 | 3/1988 |
| JP | 64-069687 | 3/1989 |
| JP | 04-005029 | 1/1992 |
| JP | 04-005030 | 1/1992 |
| JP | 52-137803 | 11/1997 |
| JP | 2005-528272 | 9/2005 |
| JP | 2011-519072 | 6/2011 |
| JP | 2011-528736 | 11/2011 |

OTHER PUBLICATIONS

"Plasticizier." http://greenvetpractice.com/pop-up/plasticizer. Retrieved from online on Dec. 18, 2012.*

* cited by examiner

*Primary Examiner* — Hannah Pak
(74) *Attorney, Agent, or Firm* — Cozen O'Connor (57) ABSTRACT

A self-sealing elastomer composition that can be used especially as a puncture-resistant layer in an inflatable article, comprising: as predominant elastomer, an unsaturated diene elastomer; a thermoplastic hydrocarbon plasticizer resin with a weight content of between 30 and 90 phr; a liquid plasticizer, the $T_g$ (glass transition temperature) of which is below −20° C., with a weight content between 0 and 60 phr; and 0 to less than 30 phr of a filler. Also disclosed is an article such as a tire provided with the puncture-resistant layer comprising the self-sealing elastomer composition. The puncture-resistant layer is advantageously combined with an airtight layer, for example based on butyl rubber, so as to form, in the inflatable article, a puncture-resistant airtight laminate.

31 Claims, 2 Drawing Sheets

SELF-SEALING COMPOSITION FOR PNEUMATIC OBJECT

RELATED APPLICATION

This is a U.S. National Phase Application under 35 USC 371 of International Application PCT/EP2009/005345, filed on Jul. 23, 2009.

This application claims the priority of French patent application Ser. No. 08/55319 filed Aug. 1, 2008, the entire content of which is hereby incorporated by reference.

FIELD OF THE INVENTION

The present invention relates to self-sealing compositions and to their use as puncture-resistant layers in any type of "inflatable" article, that is to say, by definition, any article that takes its useable shape when inflated with air.

Such compositions can be used in inflatable articles, especially inflatable tires, for sealing off any holes due to perforations in service.

BACKGROUND OF THE INVENTION

Particularly in recent years, tire manufacturers have been making considerable efforts to develop novel solutions to a problem dating from the very first use of tired wheels of the inflatable type, namely the problem of how to allow the vehicle to continue to travel despite a considerable or complete loss of pressure of one or more tires. For decades, the spare tire was considered to be the only and universal solution. Then, more recently, the substantial advantages associated with its possible omission have become apparent. The concept of "extended mobility" was developed. The associated techniques allow the same tire to run, depending on certain limits to be respected, after a puncture or a drop in pressure. This makes it possible for example to drive to a breakdown point without having to stop, often in hazardous circumstances, to fit the spare tire.

Self-sealing compositions that allow such an objective to be achieved, and which by definition are capable of automatically ensuring, that is to say without external intervention, that a tire is sealed in the event of a perforation of the latter by a foreign body, such as a nail, are particularly difficult to develop.

To be useable, a self-sealing layer must satisfy many conditions of a physical and chemical nature. In particular, it must be effective over a very wide range of operating temperatures, and be so throughout the lifetime of the tires. It must be capable of closing off the hole when the perforating object remains in place and, when the latter is expelled, said self-sealing layer must be able to fill the hole and seal the tire.

Many solutions have been devised but have not been able truly to be developed for vehicle tires, in particular through the lack of stability over time or lack of effectiveness under extreme operating temperature conditions, or else because of difficulties in manufacturing and/or using these self-sealing compositions.

Thus, to help to maintain good effectiveness at high temperature, document U.S. Pat. No. 4,113,799 (or FR-A-2 318 042) has proposed, as self-sealing layer, a composition comprising a combination of butyl rubbers of high and low molecular weights, which are partially crosslinked, optionally together with a small amount of a thermoplastic stirene elastomer.

Document U.S. Pat. No. 4,228,839 has proposed, as self-sealing layer for a tire, a rubber compound containing an irradiation-degradable first polymer material, such as polyisobutylene, and an irradiation-crosslinkable second polymer material, preferably a butyl rubber.

Document U.S. Pat. No. 4,426,468 has also proposed a self-sealing composition for a tire, based on a crosslinked butyl rubber of very high molecular weight.

A known drawback of butyl rubbers is that they suffer from large hysteresis losses (high tan δ level) over a wide temperature range, which drawback has repercussions for the self-sealing compositions themselves, with a large increase in hysteresis and an appreciable reduction in rolling resistance of the tires.

Self-sealing compositions based on unsaturated diene elastomers (natural rubber) have also been described, for the same type of application, in particular in the U.S. Pat. No. 4,913,209, U.S. Pat. No. 5,085,942 and U.S. Pat. No. 5,295,525.

These compositions are characterized by the combined presence of a high content of hydrocarbon resin as tackifier, always greater than 100 phr, and a large amount of elastomer (isoprene) in the liquid state.

Now, such a high resin content, apart from the fact that its incorporation requires very long kneading of the elastomeric matrix, may also be prejudicial to hysteresis and consequently to the rolling resistance of tires.

Furthermore, a large amount of liquid elastomer gives the composition a high fluidity, which is a source of other drawbacks, especially a risk of the self-sealing composition creeping when it is used at a relatively high temperature (typically above 60° C.), frequently encountered when certain tires are used.

SUMMARY OF THE INVENTION

One object of the invention is to provide a self-sealing composition that requires neither butyl rubber nor large amounts of hydrocarbon resin and liquid elastomer. This composition in an inflatable article gives better puncture-resistance performance than the self-sealing compositions of the prior art, particularly when used at a relatively high temperature.

This and other objects are attained in accordance with one aspect of the present invention that relates to a self-sealing elastomer composition that can be used especially as a puncture-resistant layer in an inflatable article, said composition comprising:
  as predominant elastomer, an unsaturated diene elastomer;
  a hydrocarbon resin with a weight content of between 30 and 90 phr;
  a liquid plasticizer, the $T_g$ (glass transition temperature) of which is below −20° C., with a weight content of between 0 and 60 phr; and
  0 to less than 30 phr of a filler.

Another aspect of the present invention relates to an inflatable article provided with a puncture-resistant layer comprising, as self-sealing composition, a self-sealing composition according to the invention.

Preferably, an inflatable article according to an embodiment of the invention, especially a tire, also includes an airtight layer which, when combined with the above puncture-resistant layer, constitutes a puncture-resistant airtight laminate which is particularly advantageous when said laminate is placed for example on the internal wall of said inflatable article or tire.

The present invention relates particularly to tires intended to be fitted onto vehicles of the passenger type, SUVs (Sport Utility Vehicles), two-wheel vehicles (especially bicycles and motorcycles), aircraft, or industrial vehicles chosen from vans, "heavy" vehicles, i.e. underground trains, buses, road transport vehicles (lorries, tractors, trailers), off-road vehicles, such as agricultural or civil engineering machines, and other transport or handling vehicles.

BRIEF DESCRIPTION OF THE DRAWINGS

The invention and its advantages will be readily understood in the light of the description and of the exemplary embodiments that follow, together with FIGS. 1 and 2 relating to these embodiments that show schematically in a simplified manner, without being drawn to a specific scale:
  in radial cross section, an example of a tire using a self-sealing composition according to the invention (FIG. 1); and
  an example of a compounding extruder that can be used to manufacture a self-sealing composition according to the invention (FIG. 2).

II. DETAILED DESCRIPTION OF PREFERRED EMBODIMENTS OF THE INVENTION

In the present description, unless expressly indicated otherwise, all the percentages (%) indicated are % by weight.

Moreover, any range of values denoted by the expression "between a and b" represents the range of values starting from more than "a" to less than "b" (i.e. with the limits "a" and "b" excluded), whereas any range of values denoted by the expression "from a to b" means the range of values starting from "a" and going up to "b", i.e. including the strict limits "a" and "b".

I-1. Self-Sealing Composition

The self-sealing composition or material of the invention is an elastomer composition comprising at least, as predominant elastomer (preferably with a content of more than 50 phr), an unsaturated diene elastomer, between 30 and 90 phr of a hydrocarbon resin and a liquid plasticizer, of $T_g$ below −20° C., with a weight of between 0 and 60 phr (phr denoting parts by weight per hundred parts of solid rubber). Another essential feature of said composition is that it contains no filler or, at the very most, it contains less than 30 phr thereof I-1-A. Unsaturated Diene Elastomer The term "diene" elastomer or rubber should be understood, as is known, to mean an elastomer (i.e. a homopolymer or a copolymer) at least partly obtained from diene monomers (i.e. monomers containing two carbon-carbon double bonds, whether conjugated or not).

These diene elastomers may be put into two categories, namely saturated and unsaturated. In the present application, the term "unsaturated" (or "essentially unsaturated") diene elastomer is understood to mean a diene elastomer that is partly obtained from conjugated diene monomers and having a content of repeat units obtained from conjugated dienes of greater than 30 mol %. Thus, excluded from this definition are diene elastomers such as butyl rubbers or copolymers of dienes and alpha-olefins, of the EPDM type, which may be termed "saturated" or "essentially saturated" diene elastomers because of their low content of diene-derived repeat units (always less than 15 mol %).

It is preferred to use an unsaturated diene elastomer with a content (in mol %) of repeat units of diene origin (conjugated dienes) of greater than 50%, such a diene elastomer being more preferably chosen from the group formed by polybutadienes (BR), natural rubber (NR), synthetic polyisoprenes (IR), butadiene copolymers (for example stirene-butadiene rubber or SBR), isoprene copolymers (of course, other than butyl rubber) and blends of these elastomers.

Compared with diene elastomers of the liquid type, the unsaturated diene elastomer of the composition of the invention is by definition a solid. Preferably, its number-average molecular weight (MO is between 100 000 and 5 000 000, more preferably between 200 000 and 4 000 000 g/mol. The $M_n$ value is determined in a known manner, for example by SEC: tetrahydrofuran solvent; 35° C. temperature; 1 g/l concentration; 1 ml/min flow rate; solution filtered on a filter of 0.45 μm porosity before injection; Moore calibration with calibrating polymers (for example polyisoprene); set of four WATERS columns in series ("STYRAGEL" HMW7, HMW6E, 2 HT6E); differential refractometer (WATERS 2410) detection and its associated operating software (WATERS EMPOWER).

More preferably, the unsaturated diene elastomer of the composition of the invention is an isoprene elastomer. The term "isoprene elastomer" is understood to mean, as is known, an isoprene homopolymer or copolymer, in other words a diene elastomer chosen from the group formed by natural rubber (NR), synthetic polyisoprenes (IR), butadiene-isoprene copolymers (BIR), stirene-isoprene copolymers (SIR), stirene-butadiene-isoprene copolymers (SBIR) and blends of these elastomers.

This isoprene elastomer is preferably natural rubber or a synthetic cis-1,4-polyisoprene. Among these synthetic polyisoprenes, those having a content (in mol %) of cis-1,4 bonds of greater than 90%, more preferably still greater than 95%, especially greater than 98%, are preferably used.

The above unsaturated diene elastomer, especially an isoprene elastomer such as natural rubber, may constitute all of the elastomer matrix or the predominant amount by weight (preferably comprising more than 50%, even more preferably more than 70%) of said matrix when it contains one or more other elastomers, with a diene or non-diene elastomer, for example of the thermoplastic elastomer type. In other words, and preferably, in the composition of the invention, the unsaturated (solid) diene elastomer content, especially isoprene elastomer such as natural rubber, is greater than 50 phr, more preferably greater than 70 phr. Even more preferably, this content of unsaturated diene elastomer, especially isoprene elastomer such as natural rubber, is greater than 80 phr.

According to one particular embodiment, the above unsaturated diene elastomer, especially when it is an isoprene diene elastomer such as natural rubber, is the sole elastomer present in the self-sealing composition of the invention. However, it could also, according to other possible embodiments, be combined with other (solid) elastomers in a minor content by weight, whether these be unsaturated diene elastomers (for example BR or SBR) or even saturated diene elastomers (for example butyl), or else elastomers other than diene elastomers, for example thermoplastic stirene (TPS) elastomers, for example chosen from the group formed by stirene/butadiene/stirene (SBS), stirene/isoprene/stirene (SIS), stirene/butadiene/isoprene/stirene (SBIS), stirene/isobutylene/stirene (SIBS), stirene/ethylene-butylene/stirene (SEBS), stirene/ethylene-propylene/stirene (SEPS), stirene/ethylene-ethylene-propylene/stirene (SEEPS) block copolymers and blends of these copolymers.

Surprisingly, this unsaturated diene elastomer, unfilled (or very lightly filled), has proved to be capable, after a thermoplastic hydrocarbon resin has been added in the recommended narrow range, of fulfilling the function of a highly effective self-sealing composition, as will be explained in detail in the rest of the description.

I-1-B. Hydrocarbon Resin

The second essential constituent of the self-sealing composition is a hydrocarbon resin, as a plasticizer which is solid at 23° C.

The term "resin" is reserved in the present application, by definition, as known to those skilled in the art, to a thermoplastic compound which is solid at room temperature (23° C.), as opposed to a liquid plasticizer compound such as an oil.

Hydrocarbon resins are polymers well known to those skilled in the art, essentially based on carbon and hydrogen, which can be used in particular as plasticizers or tackifiers in polymeric matrices. They are by nature miscible (i.e. compatible) in the contents used with the polymer compositions for which they are intended, so as to act as true diluents. They have been described for example in the work entitled "*Hydrocarbon Resins*" by R. Mildenberg, M. Zander and G. Collin (New York, VCH, 1997, ISBN 3-527-28617-9), Chapter 5 of which is devoted to their applications, especially in rubber tires (5.5. "*Rubber Tires and Mechanical Goods*"). They may be aliphatic, cycloaliphatic, aromatic, hydrogenated aromatic, of the aliphatic/aromatic type, i.e. based on aliphatic and/or aromatic monomers. They may be natural or synthetic resins, whether or not based on petroleum (if such is the case, they are also known as petroleum resins).

Their glass transition temperature ($T_g$) is preferably above 0° C., especially above 20° C. (usually between 30° C. and 95° C.).

As is known, these hydrocarbon resins may also be termed thermoplastic resins in the sense that they soften when heated and may thus be moulded. They may also be defined by a softening point or temperature, at which temperature the product, for example in powder form, becomes glutinous. This softening point tends to replace the melting point, which is quite poorly defined, of resins in general. The softening point of a hydrocarbon resin is generally about 50 to 60° C. higher than the $T_g$.

In the composition of the invention, the softening point of the resin is preferably above 40° C. (in particular between 40° C. and 140° C.), more preferably above 50° C. (in particular between 50° C. and 135° C.).

Said resin is used in an amount by weight of between 30 and 90 phr. Below 30 phr, the puncture-resistance performance has proved to be insufficient because of excessive stiffness of the composition, whereas above 90 phr, the material has insufficient mechanical strength with, in addition, a risk of its performance being degraded at high temperature (typically above 60° C.). For these reasons, the resin content is preferably between 40 and 80 phr, even more preferably at least equal to 45 phr, especially in the 45 to 75 phr range.

According to a preferred embodiment of the invention, the hydrocarbon resin has at least any one of, and more preferably all, the following characteristics:
- a $T_g$ above 25° C.;
- a softening point above 50° C. (in particular between 50° C. and 135° C.);
- a number-average molecular weight ($M_n$) of between 400 and 2000 g/mol; and
- a polydispersity index ($I_p$) of less than 3 (it will be recalled that $I_p=M_w/M_n$, where $M_w$ is the weight-average molecular weight).

More preferably, this hydrocarbon resin has at least any one of, and more preferably all, the following characteristics:
- a $T_g$ of between 25° C. and 100° C. (especially between 30° C. and 90° C.);
- a softening point above 60° C., in particular between 60° C. and 135° C.;
- a number-average molecular weight of between 500 and 1500 g/mol; and
- a polydispersity index $I_p$ of less than 2.

The $T_g$ is measured according to the ASTM D3418 (1999) standard. The softening point is measured according to the ISO 4625 standard ("Ring and Ball" method). The macrostructure ($M_w$, $M_n$ and $I_p$) is determined by steric exclusion chromatography (SEC): tetrahydrofuran solvent; 35° C. temperature; 1 g/l concentration; 1 ml/min flow rate; solution filtered on a filter of 0.45 μm porosity before injection; Moore calibration using polystyrene; set of three WATERS columns in series ("STYRAGEL" HR4E, HR1 and HR0.5); differential refractometer (WATERS 2410) detection and its associated operating software (WATERS EMPOWER).

As examples of such hydrocarbon resins, mention may be made of those chosen from the group formed by cyclopentadiene (abbreviated to CPD) or dicyclopentadiene (abbreviated to DCPD) homopolymer or copolymer resins, terpene homopolymer or copolymer resins, $C_5$-cut homopolymer or copolymer resins, $C_9$-cut homopolymer or copolymer resins and blends of these resins. Among the above copolymer resins, mention may more particularly be made of those chosen from the group formed by (D)CPD/vinylaromatic copolymer resins, (D)CPD/terpene copolymer resins, (D)CPD/$C_5$-cut copolymer resins, terpene/vinylaromatic copolymer resins, terpene/phenol resins, $C_5$-cut/vinylaromatic copolymer resins and blends of these resins.

The term "terpene" includes here, as is known, alpha-pinene, beta-pinene and limonene monomers. It is preferable to use a limonene monomer, a compound which, as is known, can take the form of three possible isomers: L-limonene (laevogyratory enantiomer), D-limonene (dextrogyratory enantiomer), or else dipentene (the racemic mixture of the dextrogyratory and laevogyratory enantiomers). Suitable vinylaromatic monomers are for example: stirene, alpha-methylstirene, ortho-, meta- and para-methylstirene, vinyltoluene, para-tert-butyistirene, methoxystirenes, chlorostirenes, hydroxystirenes, vinylmesitylene, divinylbenzene, vinylnaphthalene and any vinylaromatic monomer derived from a $C_9$-cut (or more generally a $C_8$- to $C_{10}$-cut).

More particularly, mention may be made of resins chosen from the group formed by (D)CPD homopolymer resins, (D)CPD/stirene copolymer resins, polylimonene resins, limonene/stirene copolymer resins, limonene/D(CPD) copolymer resins, $C_5$-cut/stirene copolymer resins, $C_5$-cut/$C_9$-cut copolymer resins and blends of these reins.

All the above resins are well known to those skilled in the art and are commercially available, for example those sold by DRT under the name "Dercolyte" in the case of polylimonene resins, those sold by Neville Chemical Company under the name "Super Nevtac" or sold by Kolon under the name "Hikorez" as regards $C_5$-cut/stirene resins or $C_5$-cut/$C_9$-cut resins, or else by Struktol under the name "40 MS" or "40 NS" or by Exxon Mobil under the name "Escorez" (which are blends of aromatic and/or aliphatic resins).

I-1-C. Liquid Plasticizer

The self-sealing composition of the invention has the essential feature of further comprising, with a content of less than 60 phr (in other words between 0 and 60 phr), a plasticizer which is liquid at 23° C. called a "low $T_g$" plasticizer, the function of which is especially to soften the matrix by diluting the diene elastomer and the hydrocarbon resin, in particular improving their "cold" self-sealing performance (that is to say the performance typically for a temperature below 0° C.). Its $T_g$ is by definition below −20° C. and is preferably below −40° C.

Any liquid elastomer, or any oil extender, whether of aromatic or non-aromatic nature, or more generally any liquid plasticizer known for its plasticizing properties with respect to elastomers, especially diene elastomers, can be used. At ambient temperature (23° C.), these plasticizers or oils, which are relatively viscous, are liquids (that is to say, as a reminder, substances having the capability of eventually adopting the form of their container), as opposed to in particular hydrocarbon resins which by their nature are solids at room temperature.

Particularly suitable are liquid elastomers having a low number-average molecular weight ($M_n$) of typically between 300 and 90 000, more generally between 400 and 50 000, for example in the form of liquid BR, liquid SBR, liquid IR or depolymerized natural rubber, as described for example in the aforementioned patent documents U.S. Pat. No. 4,913,209, U.S. Pat. No. 5,085,942 and U.S. Pat. No. 5,295,525. Blends of such liquid elastomers with oils as described below may also be used.

Also suitable are oil extenders, especially those chosen from the group formed by polyolefin oils (i.e. those resulting from the polymerization of olefins, monoolefins or diolefins), paraffinic oils, napthenic oils (of low or high viscosity, and hydrogenated or non-hydrogenated), aromatic or DAE (distillate aromatic extract) oils, MES (medium extracted solvate) oils, TDAE (treated distillate aromatic extract) oils, mineral oils, vegetable oils (and oligomers thereof, e.g. rapeseed, soybean or sunflower oils) and mixtures of these oils.

According to one particular embodiment, a polybutene-type oil may for example be used, in particular a polyisobutylene (PIB) oil, which has exhibited an excellent compromise of properties in comparison with the other oils tested, especially a conventional paraffinic oil. As examples, FIB oils are sold in particular by Univar under the name "Dynapak Poly" (e.g. "Dynapak Poly 190"), by BASF under the name "Glissopal" (e.g. "Glissopal 1000") or "Oppanol" (e.g. "Oppanol B12"); paraffinic oils are sold for example by Exxon under the name "Telura 618" or by Repsol under the name "Extensol 51".

Also suitable, as liquid plasticizers, are ether, ester, phosphate and sulphonate plasticizers, more particularly those chosen from esters and phosphates. As preferred phosphate plasticizers, mention may be made of those that contain between 12 and 30 carbon atoms, for example trioctyl phosphate. As preferred ester plasticizers, mention may in particular be made of compounds chosen from the group formed by trimellitates, pyromellitates, phthalates, 1,2-cyclohexane dicarboxylates, adipates, azelates, sebacates, glycerol triesters and mixtures of these compounds. Among the above triesters, mention may be made as preferred glycerol triesters those that predominantly comprise (for more than 50% and more preferably for more than 80% by weight) a $C_{18}$ unsaturated fatty acid, that is to say a fatty acid chosen from the group formed by oleic acid, linoleic acid, linolenic acid and mixtures of these acids. More preferably, the fatty acid used, whether of synthetic or natural origin (for example the case of sunflower or rapeseed oils) is composed of, for more than 50% by weight and even more preferably for more than 80% by weight, oleic acid. Such trioleate triesters having a high oleic acid content are well known—they have been described for example in Patent Application WO 02/088238 (or US 2004/0127617)—as plasticizing agents in tire treads.

The number-average molecular weight ($M_n$) of the liquid plasticizer is preferably between 400 and 25 000 g/mol, more preferably still between 800 and 10 000 g/mol. For excessively low $M_n$ values, there is a risk of the plasticizer migrating to the outside of the composition, whereas excessively high $M_n$ values may result in this composition becoming too stiff. An $M_n$ value between 1000 and 4000 g/mol proves to be an excellent compromise for the intended applications, in particular for use in a pneumatic tire.

The number-average molecular weight ($M_n$) of the plasticizer may be determined in a known manner, especially by SEC, the specimen being firstly dissolved in tetrahydrofuran with a concentration of about 1 g/l and then the solution is filtered on a filter of 0.45 µm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 µl. The detector is a WATERS 2410 differential refractometer and its associated software for handling the chromatograph data is the WATERS MILLENIUM system. The calculated average molecular weights are relative to a calibration curve obtained with polystirene standards.

To summarize, the liquid plasticizer is preferably chosen from the group formed by liquid elastomers, polyolefin oils, naphthenic oils, paraffinic oils, DAE oils, MES oils, TDAE oils, mineral oils, vegetable oils, ether plasticizers, ester plasticizers, phosphate plasticizers, sulphonate plasticizers and mixtures of these compounds. More preferably, this liquid plasticizer is chosen from the group formed by liquid elastomers, polyolefin oils, vegetable oils and mixtures of these compounds.

A person skilled in the art will be able, in the light of the description and the embodiments that follow, to adjust the amount of liquid plasticizer according to the particular usage conditions of the self-sealing composition, especially the usage of the inflatable article in which it is intended to be used.

Preferably, the liquid plasticizer content is in the 5 to 40 phr range, more preferably in the 10 to 30 phr range. Below the indicated minima, the elastomer composition runs the risk of being too stiff for certain applications, whereas above the recommended maxima there is a risk of insufficient cohesion of the composition and of degraded self-sealing properties.

I-1-D. Filler

The composition of the invention has the essential feature of being unfilled or only very lightly filled, that is to say containing from 0 to less than 30 phr of filler.

The term "filler" is understood here to mean any type of filler, whether they are reinforcing (typically nanoparticles with a weight-average size preferably of less than 500 nm, especially between 20 and 200 nm) or whether they are non-reinforcing or inert (typically microparticles with a weight-average size of greater than 1 µm, for example between 2 and 200 µm).

These fillers, whether reinforcing or not, are essentially there only to give the final composition dimensional stability, i.e. the minimum mechanical integrity required. When the filler is known to be reinforcing vis-à-vis an elastomer, especially an isoprene elastomer such as natural rubber, it is preferable to use an even smaller amount thereof.

Too high an amount, especially more than 30 phr, no longer makes it possible to achieve the minimum required flexibility, deformability and creep properties. For these reasons, the composition of the invention preferably contains 0 to less than 20 phr, more preferably 0 to less than 10 phr, of filler.

As examples of fillers known to those skilled in the art as reinforcing fillers, mention may in particular be made of carbon black nanoparticles or a reinforcing inorganic filler, or a blend of these two types of filler.

For example, as carbon blacks, all carbon blacks, especially blacks of the HAF, ISAF and SAF types that are conventionally used in tires (these being called tire-grade blacks), are suitable. Among such blacks, the following may more particularly be mentioned: carbon blacks of the 300, 600 or 700 series (ASTM grades), such as for example the blacks N326, N330, N347, N375, N683 and N772. Suitable reinforcing inorganic fillers are especially mineral fillers of the silica ($SiO_2$) type, especially precipitated or pyrogenic silica having a BET surface area of less than 450 $m^2/g$, preferably from 30 to 400 $m^2/g$.

As examples of fillers known to those skilled in the art as non-reinforcing or inert fillers, the following may especially be mentioned: microparticles of natural calcium carbonate (chalk) or synthetic calcium carbonate, synthetic or natural silicates (such as kaolin, talc or mica), milled silicas, titanium oxides, aluminas or even aluminosilicates. As examples of lamellar fillers, graphite particles may in particular be mentioned. Pigmenting or coloured fillers could be advantageously used to colour the composition according to the desired colour.

The physical state of the filler does not matter—it could be in the form of powder, microspheres, granules or beads, or any other suitable densified form. Of course, the term "filler" is also understood to mean mixtures of various reinforcing and/or non-reinforcing, fillers.

A person skilled in the art will know, in the light of the present description, how to adjust the formulation of the self-sealing composition so as to achieve the desired property levels and to adapt the formulation to the envisaged specific application.

According to one particular advantageous embodiment of the invention, if a reinforcing filler is present in the composition of the invention, its content is preferably less than 5 phr (i.e. between 0 and 5 phr), in particular less than 2 phr (i.e. between 0 and 2 phr). Such contents have proved to be particularly favourable to the process for manufacturing the composition of the invention, while still providing it with excellent self-sealing performance. More preferably a content between 0.5 and 2 phr is used, particularly when the filler is carbon black.

I-1-E. Various Additives

The base constituents described above, namely the unsaturated diene elastomer, the hydrocarbon plasticizing resin, the liquid plasticizer and the optional filler, are sufficient in themselves for the self-sealing composition to completely fulfil its puncture-resistance function within the inflatable articles in which it is used.

However, various other additives may be added, typically in a small amount (preferably with contents of less than 20 phr, more preferably less than 15 phr), such as for example protection agents, such as UV stabilizers, antioxidants or antiozonants, various other stabilizers, and colouring agents that can be advantageously used to colour the self-sealing composition. Depending on the intended application, fibres, in the form of short fibres or pulp, could optionally be added to give the self-sealing composition greater cohesion.

According to a preferred embodiment of the invention, the self-sealing composition further includes a system for crosslinking the unsaturated diene elastomer. This crosslinking system is preferably a sulphur-based crosslinking system, in other words what is called a "vulcanization" system.

Preferably, the sulphur-based vulcanization system includes, as vulcanization activator, a guanidine derivative, i.e. a substituted guanidine. Substituted guanidines are well known to those skilled in the art (see for example WO 00/05300) and non-limiting examples that may be mentioned include: N,N'-diphenylguanidine (abbreviated to DPG), triphenylguanidine and di-o-tolylguanidine. Preferably, DPG is used.

In this vulcanization system, to obtain optimum self-sealing performance the sulphur content is preferably between 0.1 and 1.5 phr, in particular between 0.2 and 1.2 phr (for example between 0.2 and 1.0 phr) and the guanidine derivative content is itself between 0 and 1.5 phr, in particular between 0 and 1.0 phr (especially in the 0.2 to 0.5 phr range).

Said system does not require a vulcanization accelerator to be present. According to a preferred embodiment, the composition may therefore contain no such accelerator, or at the very most it may contain less than 1 phr, more preferably less than 0.5 phr, thereof. If such an accelerator is used, examples that may be mentioned include any compound (primary or secondary accelerator) capable of acting as a vulcanization accelerator for diene elastomers in the presence of sulphur, especially accelerators of the thiazole type and derivatives thereof, accelerators of the thiuram type, and zinc dithiocarbamates. According to another advantageous embodiment, the above vulcanization system may contain no zinc or zinc oxide (these being known as vulcanization activators).

According to another possible embodiment of the invention, a sulphur donor may be used instead of sulphur itself. Sulphur donors are well known to those skilled in the art. Typically, the amount of such a sulphur donor will preferably be adjusted to be between 0.5 and 10 phr, more preferably between 1 and 5 phr, so as to achieve the preferred equivalent sulphur contents indicated above.

After curing, a vulcanization system as described above gives the composition sufficient cohesion, without truly vulcanizing it: the amount of crosslinking, which can be measured using a conventional swelling method known to those skilled in the art, is in fact close to the detection threshold.

Apart from the elastomers described above, the self-sealing composition could also contain, again as a minor weight fraction relative to the unsaturated diene elastomer, polymers other than elastomers such as, for example, thermoplastic polymers compatible with the unsaturated diene elastomer.

I-2. Manufacture of the Self-Sealing Composition

The composition described above may be manufactured by any appropriate means, for example by compounding and/or kneading in blade mixers or open mills, until an intimate homogeneous mixture of its various components has been obtained.

However, the following manufacturing problem may arise: in the absence of any filler, or at least an appreciable amount of filler, the composition is not very cohesive. This lack of cohesion may be such that the tack of the composition, due moreover to the presence of a relatively high hydrocarbon resin content, is not compensated for and causes some of the composition to be carried away—it follows that there is a risk of it sticking undesirably on the compounding tools, which situation may be unacceptable under industrial operating conditions.

To alleviate the above problems, the self-sealing composition of the invention, when it to includes a vulcanization system, may be prepared using a process comprising the following steps:

a) firstly a masterbatch comprising at least one unsaturated diene elastomer and between 30 and 90 phr of hydrocarbon resin is manufactured, by compounding these various components in a mixer at a temperature or up to a temperature called the "hot compounding temperature" or "first temperature" which is above the softening point of the hydrocarbon resin; and b) then at least the crosslinking system is incorporated into said masterbatch, by compounding everything, in the same mixer or in a different mixer, at a temperature or up to a temperature called the "second temperature" which is maintained below 100° C., in order to obtain said self-sealing composition.

The above first and second temperatures are of course those of the masterbatch and of the self-sealing composition respectively, these being temperatures measureable in situ and not the set temperatures of the mixers themselves.

The term "masterbatch" should be understood here to mean, by definition, a compound comprising at least the diene elastomer and the hydrocarbon resin, namely the precursor compound for the final self-sealing composition ready to be used.

The liquid plasticizer may be completely or partly incorporated at any moment, especially during the manufacture of the masterbatch itself (in this case, before, during or after incorporation of the hydrocarbon resin into the diene elastomer), "hot" (i.e. at a temperature above the softening point of the resin), as at a lower temperature, or for example after the manufacture of the masterbatch (in this case, before, during or after addition of the crosslinking system).

Optionally, various additives may be incorporated into this masterbatch, whether these are intended for the masterbatch proper (for example a stabilizing agent, a colorant, a UV stabilizer, an antioxidant, etc.) or for the final self-sealing composition for which the masterbatch is intended.

Such a process has proved to be particularly suitable for rapidly manufacturing, under industrially acceptable operating conditions, an effective self-sealing composition, which composition may have high hydrocarbon contents without requiring in particular the use of a liquid plasticizer in a particularly high content.

It is during the hot compounding step a) that the diene elastomer is brought into contact with the hydrocarbon resin in order to manufacture the masterbatch. In the initial state, that is to say before it comes into contact with the elastomer, the resin may be in the solid state or in the liquid state. Preferably, for better compounding, the solid diene elastomer is brought into contact with the hydrocarbon in the liquid state. To do this, it suffices to heat the resin to a temperature above its softening point. Depending on the type of hydrocarbon resin used, the hot compounding temperature is typically above 70° C., usually above 90° C., for example between 100° C. and 150° C.

It is preferred for the liquid plasticizer to be at least partly introduced during step a) in the manufacture of the masterbatch itself, preferably in this case either at the same time as the hydrocarbon resin or after the latter has been introduced. According to one particularly advantageous embodiment, the hydrocarbon resin and the liquid plasticizer may be blended together prior to incorporation into the diene elastomer.

Step b) of incorporating the crosslinking system is carried out at a temperature preferably below 80° C., of preferably below the softening point of the resin. Thus, depending on the type of hydrocarbon resin used, the compounding temperature of step b) is preferably below 50° C., more preferably between 20° C. and 40° C.

If necessary, an intermediate step of cooling the masterbatch may be inserted between the above steps a) and b) so as to bring the masterbatch temperature to below 100° C., preferably below 80° C., especially below the softening point of the resin, before introduction (step b)) of the crosslinking system into the masterbatch prepared beforehand.

When a filler such as carbon black is used, it may be introduced during step a), i.e. at the same time as the unsaturated diene elastomer and the hydrocarbon resin, or else during step b), i.e. at the same time as the crosslinking system. It has been found that a very small proportion of carbon black, preferably between 0.5 and 2 phr, further improves the compounding and the manufacture of the composition, and also its final extrudability.

Figure 2:
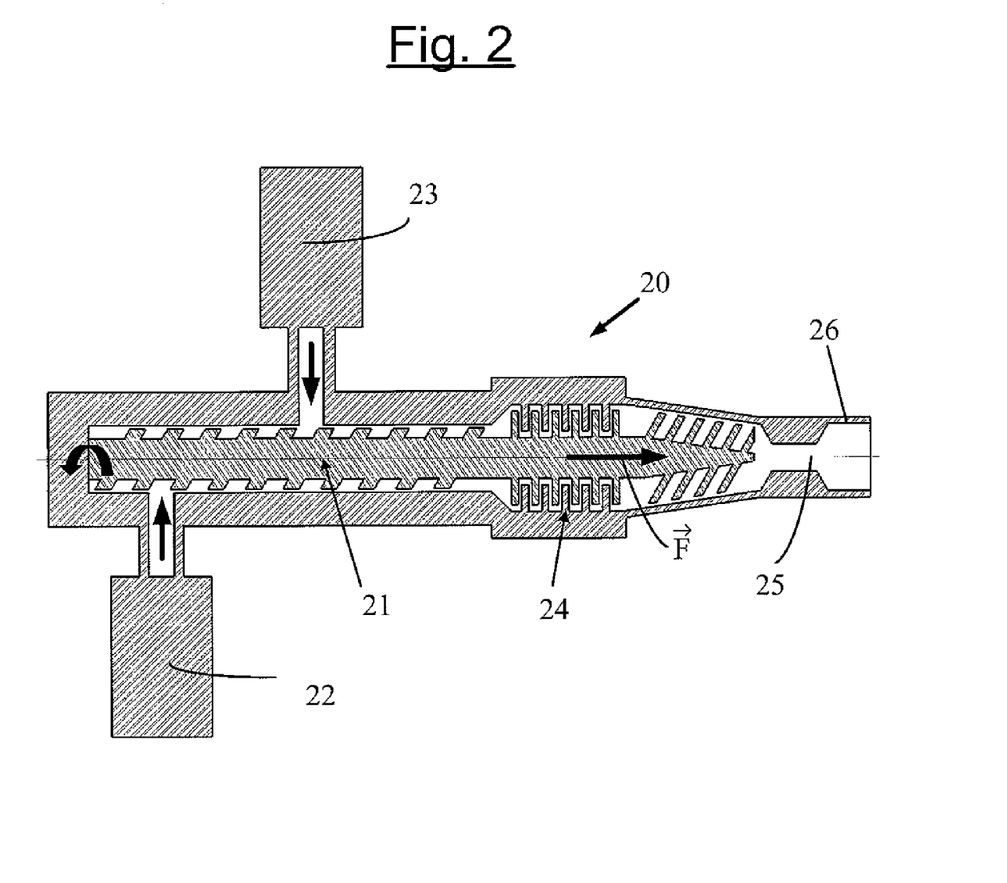

Step a) of manufacturing the masterbatch is preferably carried out in a compounding screw extruder as shown schematically for example in a simplified manner in FIG. 2.

FIG. 2 shows a compounding screw extruder (20) essentially comprising an extrusion screw (21) (for example a single-screw compounding extruder), a first metering pump (22) for the diene elastomer (which is solid) and at least a second metering pump (23) for the resin (which is solid or liquid) and the liquid plasticizer. The hydrocarbon resin and the liquid plasticizer may be introduced for example by means of a single metering pump, if they have already been mixed beforehand, or else they may be introduced separately by means of a second pump and a third pump (the third pump not being shown in FIG. 2 to simplify the drawing), respectively. The metering pumps (22, 23) are used to raise the pressure in the extruder while still controlling the metering and the initial characteristics of the materials, the separation of the metering function (for the elastomer, the resin and the liquid plasticizer) from the compounding function furthermore providing better control of the process.

The products, driven by the extrusion screw, are intimately compounded under the very high shear provided by the rotation of the screw, thus progressing through the mixer, for example up to a part (24) called the "chopper-homogenizer", after which zone the final masterbatch (25) thus obtained, progressing in the direction of the arrow (F), is finally extruded through a die (26) for extruding the product to the desired dimensions.

The masterbatch thus extruded, ready to be used, is then transferred and cooled, for example on an external mixer of the two-roll open mill type for introducing the crosslinking system and the optional filler, the temperature within said external mixer being kept below 100° C., preferably below 80° C. and more preferably below the softening point of the resin. Advantageously, the rolls of the above open mill are cooled, for example by circulating water, to a temperature below 40° C., preferably to below 30° C., so as to avoid any undesirable sticking of the composition to the walls of the mill.

It is possible for the masterbatch output by the extrusion device (20) to be formed directly, so as to make it easier to transport to and/or place in the external mixer. It is also possible for the two-roll open mill to be continuously fed.

Thanks to the preferred process and specific devices described above, it is possible to prepare the composition of the invention under satisfactory industrial conditions without running the risk of contaminating the tools due to undesirable sticking of the composition on the walls of the mixers.

I-3. Use of the Self-Sealing Composition as Puncture-Resistant Layer

The self-sealing composition or material described above is an elastic compound which is solid (at 23° C.) and is characterized in particular, thanks to its specific formulation, by a very high flexibility and deformability.

It may be used as a puncture-resistant layer in any type of "inflatable" article, that is to say, by definition, any article that takes its useable form when inflated with air.

Examples of such inflatable articles that may be mentioned include inflatable boats and balloons or balls used for games or sport.

It is particularly well suited to use as a puncture-resistant layer in an inflatable article, finished or semifinished product, made of rubber, most particularly in a tire for a motor vehicle, such as a vehicle of the two-wheeled type, a passenger or industrial vehicle, or a non-automobile vehicle such as a bicycle.

Such a puncture-resistant layer is preferably placed on the internal wall of the inflatable article, completely or at least partly covering it, but it may also be completely integrated into its internal structure.

The thickness of the puncture-resistant layer is preferably greater than 0.3 mm, more preferably between 0.5 mm and 10 mm (in particular between 1 and 5 mm).

It will be readily understood that, in the specific fields of application, the dimensions and the pressures involved and the method of implementing the invention may vary, the puncture-resistant layer then comprising several preferred thickness ranges. Thus, for example, for tires of the passenger vehicle type, said puncture-resistant layer may have a thickness of at least 0.5 mm, preferably between 1 and 5 mm. According to another example, for heavy or agricultural vehicle tires, the preferred thickness may be between 1 and 6 mm. According to another example, for vehicle tires in the civil engineering or aircraft field, the preferred thickness may be between 2 and 10 mm. Finally, according to another example, for bicycle tires, the preferred thickness may be between 0.4 and 2 mm.

The self-sealing composition described here has the advantage of suffering practically no adverse effect in terms of rolling resistance, over a very wide operating temperature range of the tires, compared with a tire not having such a self-sealing layer. Compared with the usual self-sealing compositions, the risks of excessive creep during use at a relatively high temperature (typically above 60° C.), as is frequently encountered when using certain tires, are appreciably reduced.

Of course, the invention applies to cases in which the self-sealing composition described above is used in a tire or any other inflatable article without necessarily being combined with an airtight layer.

However, according to a particular preferred embodiment of the invention, the self-sealing composition is combined with at least a second, airtight layer in order to form a multilayer laminate, which is self-sealing and airtight, and which can be used in particular as an internal wall of an inflatable article such as a tire.

The second layer of the laminate may comprise any type of material that can fulfil the function of an airtight film (or more generally a gastight film), whether this is for example a metallic material or a polymeric material. Preferably, this airtight layer has a thickness of greater than 0.05 mm, more preferably between 0.05 and 6 mm (for example from 0.1 to 2 mm).

According to a preferred embodiment, this airtight second layer comprises a butyl rubber composition. The term "butyl rubber" should be understood, as is known, to mean an isobutylene/isoprene copolymer (abbreviated to IIR), and also halogenated, preferably chlorinated or brominated, versions of this type of copolymer. Preferably, the butyl rubber is a halogenated butyl rubber or a blend of halogenated and non-halogenated butyls. The butyl rubber may be used by itself or in combination with one or more other elastomers, especially diene elastomers, such as for example natural rubber or a synthetic polyisoprene. The airtight composition also includes the various additives that are usually present in the airtight layers known to those skilled in the art, such as reinforcing fillers, such as carbon black, lamellar fillers improving the sealing (e.g. phyllosilicates such as kaolin, talc, mica, clays or modified clays ("organo clays")), protective agents such as antioxidants or antiozonants, a crosslinking system (for example based on sulphur or peroxide) and various processing aids or other stabilizers.

The two layers of the above laminate may be joined together by any appropriate means, for example by a simple heat treatment, preferably under pressure (for example for several minutes at 150° C. under a pressure of 16 bar) using various adhesives or by inserting a third adhesive layer to stick the two other layers together.

II. EXEMPLARY EMBODIMENT OF THE INVENTION

The self-sealing composition and the multilayer laminate described above may advantageously be used in tires for all types of vehicle, particularly in tires for passenger vehicles liable to run at very high speed or tires for heavy industrial vehicles such as heavy goods vehicles liable to run and operate under particularly high internal temperature conditions.

Figure 1:
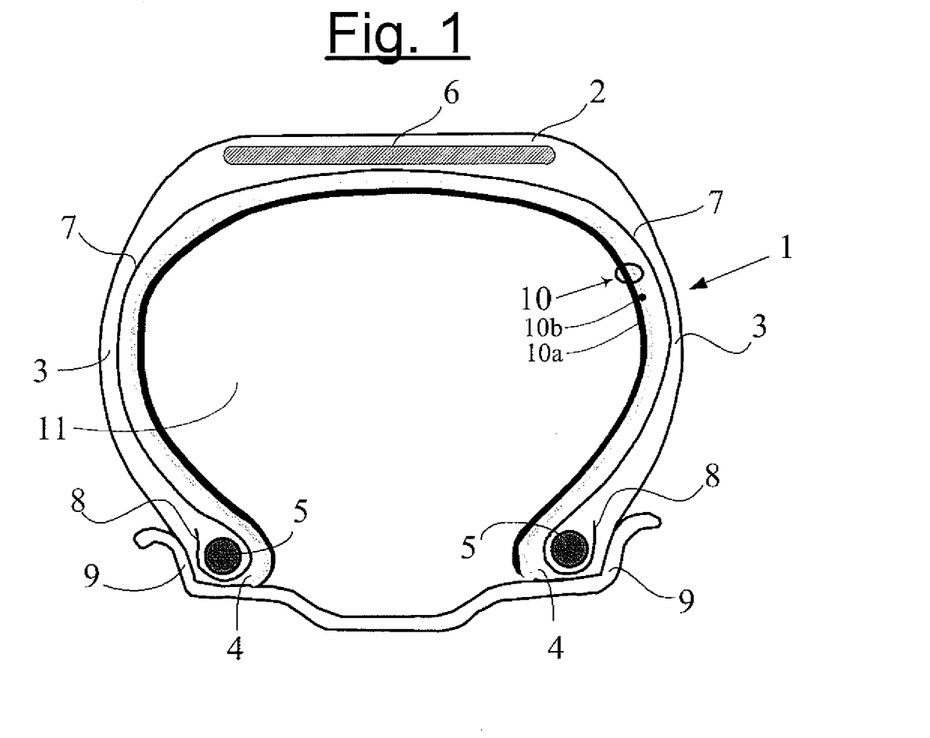

To give an example, the appended FIG. 1 shows very schematically (without complying to a specific scale), a radial cross section through a tire according to the invention.

This tire 1 comprises a crown 2 reinforced by a crown reinforcement or belt 6, two sidewalls 3 and two beads 4, each of these beads 4 being reinforced with a bead wire 5. The crown 2 is surmounted by a tread (not shown in this schematic figure). A carcass reinforcement 7 is wound around the two bead wires 5 in each bead 4, the upturn 8 of this reinforcement 7 lying for example towards the outside of the tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to make an angle of between 80° and 90° with the circumferential mid-plane (the plane perpendicular to the rotation axis of the tire, which lies at mid-distance between the two beads 4 and passes through the middle of the crown reinforcement 6).

The tire 1 is characterized in that its internal wall includes a multilayer laminate (10) comprising at least two layers (10a, 10b), which is self-sealing thanks to its first layer (10a) and airtight thanks to its second layer (10b).

According to a preferred embodiment of the invention, the two layers (10a, 10b) cover substantially the entire internal wall of the tire, extending from one sidewall to the other, at least up to level with the rim gutter when the tire is in the fitted position. According to other possible embodiments, the layer 10a could however cover only a portion of the airtight zone (layer 10b), for example only the crown zone of the tire, or it could extend at least from the crown zone to the shoulders or to the mid-point (the equator) of said tire.

According to another preferred embodiment, the laminate is placed in such a way that the self-sealing first layer (10a) is radially the outermost layer in the tire relative to the other layer (10b), shown schematically in the appended figure. In other words, the self-sealing layer (10a) covers the airtight layer (10b) on the side facing the internal cavity 11 of the tire 1. Another possible embodiment is that in which this layer (10a) is the radially most internal layer, therefore placed between the sealed layer (10b) and the rest of the structure of the tire 1.

In this example, the layer 10b (with a thickness of 0.7 to 0.8 mm) is based on butyl rubber and has a conventional formulation for an "inner liner" which usually defines, in a conventional tire, the radially internal face of said tire, intended to protect the carcass reinforcement from air diffusing from the internal space of the tire. This airtight layer 10b therefore enables the tire 1 to be inflated and to hold pressure. Its sealing properties enable it to guarantee a relatively low rate of pressure loss, enabling the tire to be kept inflated, in a normal operating state, for a sufficient duration, normally for several weeks or several months.

The layer 10a itself consists of a self-sealing composition according to the invention comprising the three essential constituents, namely natural rubber (100 phr), about 50 phr of a hydrocarbon resin ("Escorez 2101" from Exxon Mobil, having a softening point of about 90° C.) and about 15 phr of a liquid polybutadiene ("Ricon 154" from Sartomer Cray Valley, having an $M_n$ of about 5200); it also contains a very small amount (1 phr) of carbon black (N772).

The above self-sealing composition was prepared using a single-screw (40 L/D) extruder as shown schematically in FIG. 2 (which has already been commented upon). The three base constituents (NR, resin and liquid plasticizer) were compounded at a temperature (between 100 and 130° C.) above the softening point of the resin. The extruder used had two different feeds (hoppers) (one for the NR and the other for the resin and the liquid plasticizer which were mixed together beforehand at a temperature of about 130 to 140° C.) and a pressurized liquid injection pump for the resin/liquid plasticizer blend (injected at a temperature of about 100 to 110° C.). When the elastomer, resin and the liquid plasticizer had thus been intimately compounded, it was found that the undesirable tack of the composition was very significantly reduced.

The above extruder was provided with a die for extruding the masterbatch to the desired dimensions into a two-roll open mill for the final incorporation of the other constituents, namely the vulcanization system based on sulphur (for example 0.5 or 1.2 phr) and DPG (for example 0.3 phr) and carbon black (with a content of 1 phr), at low temperature maintained below +30° C. (by cooling the rolls with circulating water).

The layer 10a, placed therefore between the layer 10b and the cavity 11 of the tire, gives the tire effective protection against loss of pressure due to accidental perforations, enabling these perforations to be automatically sealed off.

If a foreign body, such as a nail, passes through the structure of the tire, for example a wall, such as a sidewall 3 or the crown 6 of the tire 1, the composition serving as self-sealing layer is subjected to several stresses. In reaction to these stresses, and thanks to its advantageous deformability and elasticity properties, said composition creates an impermeable contact zone around the body. It does not matter whether the contour or the profile of said body is uniform or regular, the flexibility of the self-sealing composition enables it to be insinuated into openings of very small size. This interaction between the self-sealing composition and the foreign body seals the zone affected by said body.

In the event of the foreign body being removed, whether accidentally or intentionally, a perforation remains, this being liable to create a relatively large leak, depending on its size. The self-sealing composition, exposed to the hydrostatic pressure, is sufficiently soft and deformable to seal off, by being deformed, the perforation, preventing the inflation gas from leaking. In particular in the case of a tire, it has been shown that the flexibility of the self-sealing composition enables the forces of the surrounding walls to be withstood without any problems, even during phases in which the loaded tire deforms when running.

The tire provided with its puncture-resistant layer (10a) as described above may be produced before or after vulcanization (or curing).

In the first case (i.e. before the tire is cured), the self-sealing composition is simply applied in a conventional manner at the desired place, so as to form the layer 10a. The vulcanization operation is then carried out conventionally.

An advantageous manufacturing variant, for a person skilled in the art of manufacturing tires, would for example consist, during a first step, in depositing the self-sealing composition flat, directly on a tire-building drum, in the form of a skim of suitable thickness (for example 2 to 6 mm), before being covered with the airtight layer, followed by the rest of the structure of the tire, using manufacturing techniques well known to those skilled in the art. This type of process also allows the second embodiment, in which the sealing layer 10b is the radially outermost layer, to be easily produced.

In the second case (i.e. after the tire is cured), the self-sealing composition is applied to the inside of the cured tire by any appropriate means, for example by bonding, by spraying or by extrusion-blowing a film of appropriate thickness.

During trials, tires of the passenger car type, of 205/55 R16 size, of the "Michelin, Energy 3 brand" were tested. The internal wall of the tires (already including the airtight layer (10b)) was covered with the self-sealing layer (10a) described above, having a thickness of 3 mm, and then the tires were vulcanized.

On one of the tires, when fitted and inflated, eight perforations 5 mm in diameter were produced through the tread and the crown block on the one hand, and through the sidewalls on the other, using punches that were immediately removed.

Unexpectedly, this tire withstood being rotated at 150 km/h on a rolling drum under a nominal load of 400 kg without loss of pressure for more than 1500 km, after which distance the rolling was stopped.

On another tire, the test was carried out in the same way but this time leaving the perforating objects in place for one week. The same excellent result was obtained.

Without the self-sealing composition and under the same conditions as above, the tire thus perforated loses its pressure in less than one minute, becoming completely unsuitable for rolling.

Other endurance tests were carried out on tires according to the invention, identical to the previous tires but having been run for 750 km, at a speed of 150 km/h, this time leaving the punches in their perforations. After the punches had been removed (after their expulsion as a result of the rolling), these tires of the invention withstood being rotated on a rolling drum without loss of pressure, under the same conditions as previously (distance travelled: 1500 km; speed: 150 km/h; nominal load: 400 kg).

The invention claimed is:

1. A self-sealing elastomer composition that can be used especially as a puncture-resistant layer in an inflatable article, comprising:
    as predominant elastomer, an unsaturated diene elastomer;
    a hydrocarbon resin with a weight content of between 30 and 90 phr;
    a liquid plasticizer, the Tg (glass transition temperature) of which is below −20° C., with a weight content between 10 and 60 phr, wherein the liquid plasticizer has a number of average molecular weight of 300-90,000 and is selected from liquid elastomers, polyolefinic oils, naphthenic oils, paraffinic oils, DAE oils, MES oils, TDAE oils, mineral oils, vegetable oils, ether plasticizers, ester plasticizers, phosphate plasticizers, sulphonate plasticizers and mixtures thereof; and
    0 to less than 30 phr of a filler.

2. The composition according to claim 1, wherein the unsaturated diene elastomer is chosen from the group formed by polybutadienes, natural rubber, synthetic polyisoprenes, butadiene copolymers, isoprene copolymers and blends of these elastomers.

3. The composition according to claim 2, wherein the unsaturated diene elastomer is an isoprene elastomer chosen from the group fanned by natural rubber, synthetic polyisoprenes and blends of these elastomers.

4. The composition according to claim 1, wherein the unsaturated diene elastomer content is greater than 50 phr.

5. The composition according to claim 1, wherein the isoprene elastomer is the sole elastomer of the composition.

6. The composition according to claim 1, wherein the number-average molecular weight of the diene elastomer is between 100 000 and 5 000 000 g/mol.

7. The composition according to claim 1, wherein the hydrocarbon resin content is in the 45 to 75 phr range.

8. The composition according to claim 1, wherein the hydrocarbon resin has a Tg (glass transition temperature) above 0° C.

9. The composition according to claim 8, wherein the hydrocarbon resin has a Tg of between +25 and +100° C.

10. The composition according to claim 1, wherein the number-average molecular weight of the hydrocarbon resin is between 400 and 2000 g/mol.

11. The composition according to claim 1, wherein the hydrocarbon resin is chosen from the group formed by cyclopentadiene (CPD) homopolymer or copolymer resins, dicyclopentadiene (DCPD) homopolymer or copolymer resins, terpene homopolymer or copolymer resins, C5-cut homopolymer or copolymer resins, C9-cut homopolymer or copolymer resins and blends of these resins.

12. The composition according to claim 1, wherein the liquid plasticizer content is in the 10 to 40 phr range.

13. The composition according to claim 12, wherein the liquid plasticizer content is in the 10 to 30 phr range.

14. The composition according to claim 1, wherein the liquid plasticizer is chosen from liquid elastomers, polyolefinic oils, vegetable oils and mixtures of these compounds.

15. The composition according to claim 1, comprising 0 to less than 20 phr of filler.

16. The composition according to claim 1, comprising carbon black as reinforcing filler.

17. The composition according to claim 16, comprising less than 5 phr of carbon black.

18. The composition according to claim 17, comprising between 0.5 and 2 phr of carbon black.

19. The composition according to claim 1, further comprising a vulcanization system.

20. The composition according to claim 19, wherein the vulcanization system is based on sulphur and a guanidine derivative.

21. The composition according to claim 20, wherein the guanidine derivative is diphenylguanidine.

22. The composition according to claim 20, wherein the vulcanization system comprises between 0.1 and 1.5 phr of sulphur and between 0 and 1.5 phr of guanidine derivative.

23. The composition according to claim 22, wherein the vulcanization system comprises between 0.2 and 1.2 phr of sulphur and between 0 and 1.0 phr of guanidine derivative.

24. An inflatable article provided with a puncture-resistant layer, said layer comprising, as self-sealing composition, the elastomer composition according to claim 1.

25. The article according to claim 24, wherein the self-sealing composition is in the form of a puncture-resistant layer having a thickness of greater than 0.3 mm.

26. The article according to claim 25, wherein the puncture-resistant layer has a thickness of between 0.5 mm and 10 mm.

27. The article according to claim 24, wherein the puncture-resistant layer is deposited on the internal wall of the inflatable article.

28. The article according to claim 24 which is a rubber article.

29. The article according to claim 28, which is a tire.

30. The article according to claim 24, wherein the puncture-resistant layer is combined with an airtight layer thus constituting an airtight self-sealing laminate.

31. The article according to claim 30, wherein the airtight layer is based on butyl rubber.

* * * * *